L. A. GROSSMAN & R. SCHIMEK.
WRAPPING PAPER DISPENSING APPARATUS.
APPLICATION FILED JUNE 15, 1918.
1,301,837.
Patented Apr. 29, 1919
3 SHEETS—SHEET 1.
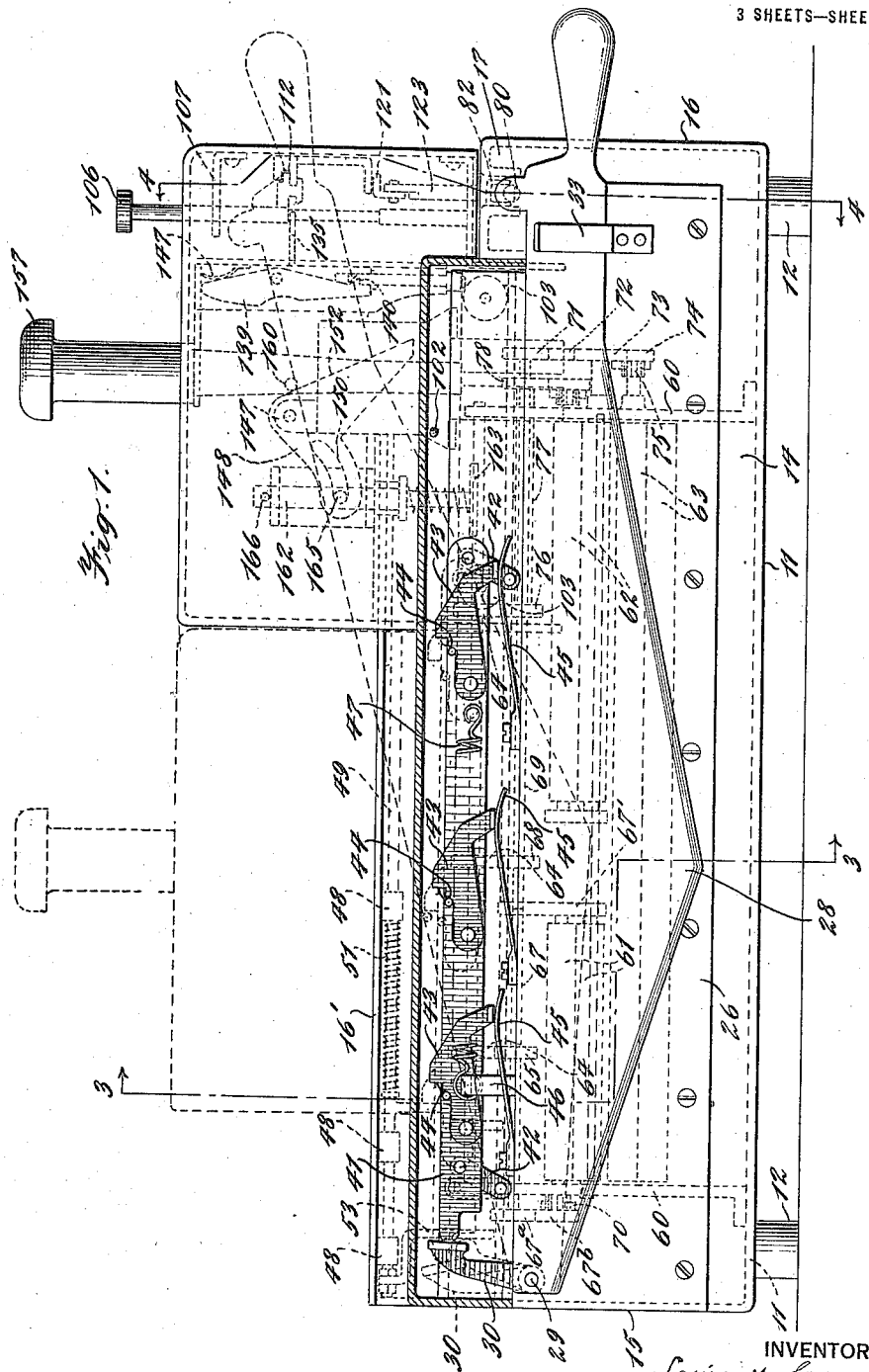
INVENTOR
Louis A. Grossman
Richard Schimek
BY
Rosenbaum Stockbridge Boost
ATTORNEY

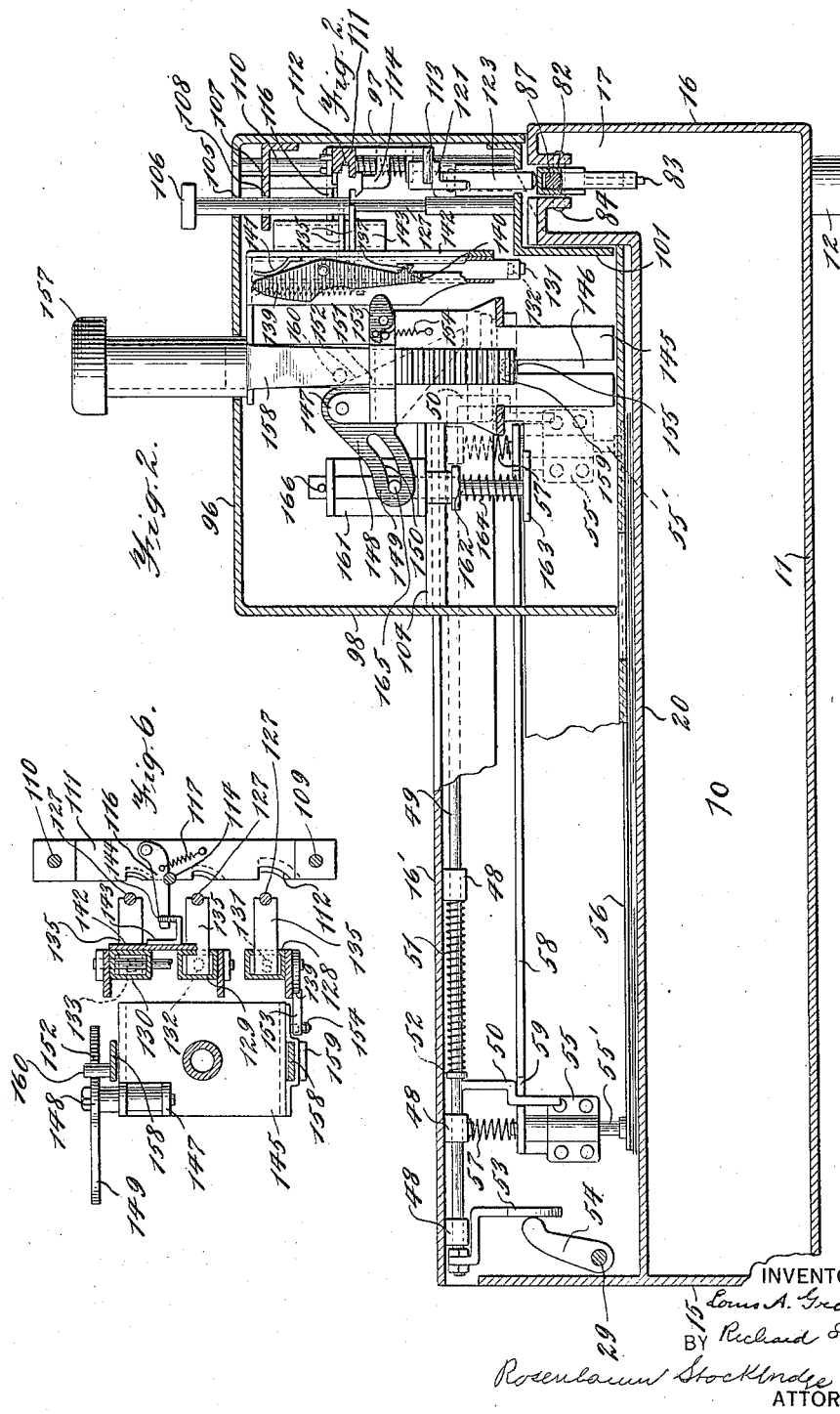

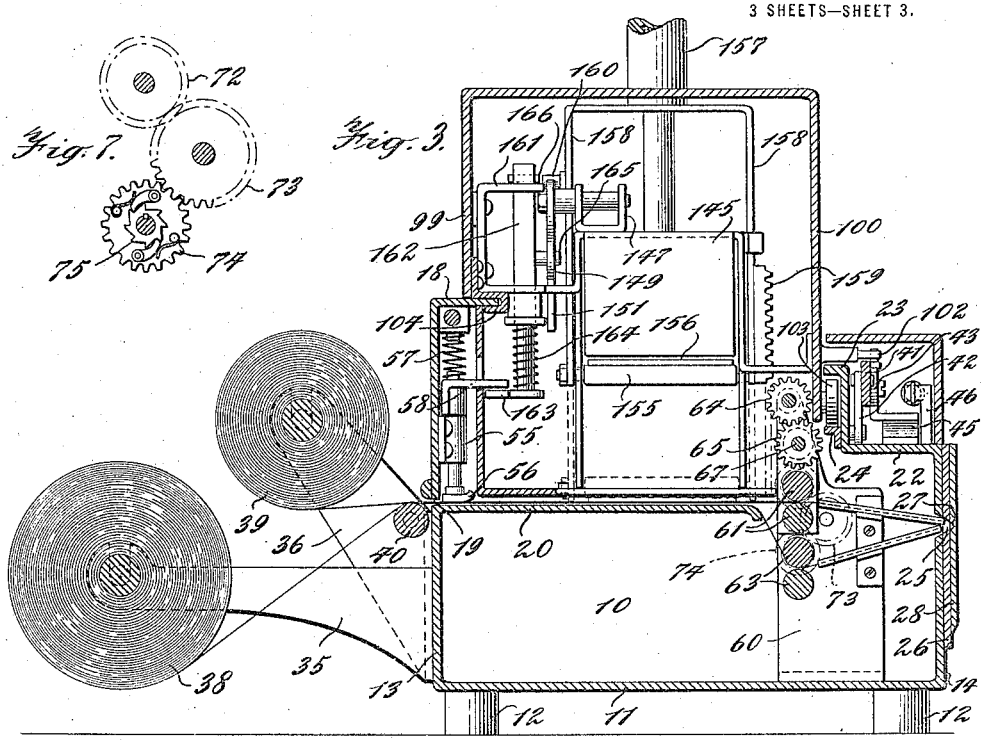

UNITED STATES PATENT OFFICE.

LOUIS A. GROSSMAN AND RICHARD SCHIMEK, OF NEW YORK, N. Y.

WRAPPING-PAPER-DISPENSING APPARATUS.

1,301,837.   Specification of Letters Patent.   Patented Apr. 29, 1919.

Application filed June 15, 1918. Serial No. 240,198.

*To all whom it may concern:*

Be it known that we, LOUIS A. GROSSMAN and RICHARD SCHIMEK, citizens of the United States, residing at the city of New York, in the borough of Manhattan and State of New York, have invented certain new and useful Improvements in Wrapping-Paper-Dispensing Apparatus, of which the following is a full, clear, and exact description.

Our invention relates to paper dispensing appliances and in particular to an appliance in which the paper can be dispensed only when a proper mark has been stamped thereon.

It is customary in large establishments, to have merchandise which is sold, wrapped by a person other than the sales person. The sales person usually delivers a sales slip to the customer who presents it at a wrapping desk and claims the package. The package, which does not bear any particular identifying mark, is delivered to the customer without any further evidence of ownership than the presentation of the sales slip, which may or may not be the sales slip of the particular transaction. Hence it frequently happens that either through error or fraud the wrong parcel is delivered, which entails confusion and sometimes considerable loss to the concern. Frequently parcels are also delivered to a customer in collusion with the sales person without a sales slip having been made out or the transaction recorded. While, of course, goods are sometimes delivered to a customer unwrapped, this is unusual on account of the many possibilities of detection. Hence, an apparatus which compels the printing of the identifying marks before the paper can be used is of considerable utility in obviating errors and fraud.

In our apparatus errors and the possibility of fraud are largely eliminated by furnishing a mechanism which provides successively differing identifying marks on the paper used for each package and prevents paper being used without such identifying mark having been applied. The use of this mechanism with its normally locked paper necessarily requires that the sales person record the sale, otherwise the serial number stamped on the wrapper would no longer agree with the serial number stamped by the instrumentality used to record sales, for instance, a cash register.

A paper dispensing apparatus must necessarily dispense strips of paper of different widths to avoid waste and this necessitates mechanism for applying the desired data to any one of a number of widths. Our apparatus accomplishes this result in a simple and efficient manner.

In the drawings accompanying this application and forming a part thereof, one example of our invention is shown.

Figure 1 is a side elevation partly in section and showing by dotted lines elements in different stages of operation;

Fig. 2 is a longitudinal section of the apparatus, with some of the elements broken away;

Fig. 3 is a section of Fig. 1, on the line 3—3;

Fig. 4 is a section of Fig. 1 on the line 4—4;

Fig. 5 is an enlarged detail view of some of the elements shown in Fig. 2, partly in section;

Fig. 6 is a top irregular sectional view of some of the elements shown in Fig. 2; and Fig. 7 is a detail of the ratchet control of the gears shown in Fig. 3.

Referring to the drawings, a casing indicated in its entirety by 10 comprises a lower wall 11, preferably provided with a plurality of legs 12 on which it is adapted to rest, side walls 13 and 14, end walls 15 and 16, and top wall 16'. The member 10 has an upstanding portion 17 at one end forming a stop for a sliding carriage, to be described. The side wall 13 has a horizontally extending platform 18 at its upper end and a horizontal slot 19 located between the platform and lower wall 11 for the entrance of strips of paper, to be described. A horizontal printing bed 20 extends from the wall 13 into the member 10 contiguous to the lower side of the slot 19. The opposite side wall 14 has a horizontal platform 22 having at one end a vertically extending wall 23 provided with a track 24. The wall 14 is further provided with a horizontal slot 25 and a knife plate 26 secured thereto in any convenient manner having knife edges 27 registering with the edges of slot 25. One end of a shearing knife 28 is secured to the end of a rotatable shaft 29 transversely located in the rear end of the member 10. A pusher arm 30 is secured to the rotating shaft 29 and extends at substantially right angles to the axis of the knife 28. The knife plate 26 is provided with a bracket 33 at the opposite end from the shaft 29, to support the knife 28 when in its lowermost position. A plurality of brackets 35 and 36 extend from the outer face of the wall 13 and carry loosely mounted rolls of paper of different widths 38 and 39, respectively. The apparatus illustrated is designed for an additional roll, not shown. Any number of rolls of paper and appurtenances may be employed according to the number of widths of paper desired. The brackets are preferably provided with an idler 40 to guide the paper of roll 38 to the longitudinal slot 19 of the wall 13. A horizontally extending plate 41 is connected to the wall 23 by a plurality of links 42 which are inclined to the vertical, as shown in Fig. 1 of the drawing, when the knife 28 is in the bracket 33, the pusher arm 30 secured to shaft 29 holding it in depressed position. The plate 41 is provided with a plurality of pivoted triggers 43 corresponding in number to the number of rolls of paper employed and each having a shoulder 44 normally pressed into operative position by the flat springs 45 secured to the wall 22. A bracket 46 is secured to the wall 22 and is connected with the plate 41 by a spring 47 resiliently holding the plate toward the left when viewed, as in Fig. 1, and tending to lift the knife 28. A plurality of brackets 48 are secured to the underside of the top wall 16' of the member 10 and support a horizontally slidable shaft 49 having a pair of triggers 50 secured near each end. A helical spring 51 surrounds the shaft 49, one end bearing against a collar 52 formed with the shaft 49, and the other bearing against one of the brackets 48, and tending to press the shaft and its triggers toward the left when viewed as in Fig. 2. The shaft 49 is provided at one end with a striker plate 53 against which a pusher arm 54 secured to shaft 29 is adapted to strike and move the shaft 49 and its accompanying triggers 50 to the right. A plurality of brackets 55 are secured to the wall 13, in which slide vertically movable presser feet 55' normally pressed downward as shown in Fig. 2 by springs 57. The feet 55' are connected at their lower ends by a presser plate 56 adapted to bear on all the sheets of paper, as will be described. A plate 58 is secured to and connects together the shanks of the presser feet 55', and is provided with notches 59 which the triggers 50 enter. The triggers 50 are disengaged from the plate 58 when the presser plate 56 is in engagement with the paper and pressing the latter against the bed 20. The triggers 50 are adapted to hold the plate 58 in a raised position until released, in the manner to be described. A pair of vertically-extending brackets 60 are secured to the lower wall 11 of the member 10 and support the pairs of rollers 61, 62 and 63, preferably rubber covered, one of each pair being idle and the other being operated by an independent train of gears adapted to be engaged and operated on the reciprocations of a rack to be described. Gears 64, one for each pair of rollers, are idly supported on a transverse shaft carried by brackets 60. The left hand gear 64 meshes with gear 65 secured to a rotatable shaft 67 carried in bearings in the brackets 60 and 67', which latter bracket extends from wall 14. A gear $67^a$ is secured to the end of the shaft 67 and drives the pair of rollers 61 through gear $67^b$ and ratchet and pawl connection 70. A gear 68 actuated by the middle idler gear 64 is mounted on a shaft 69 which is supported in bearings in the brackets 67' and 60. This gear drives the large pair of rollers 63 through a gear 71 secured to its end and gear train comprising pinion 72, gear 73 and gear 74 carrying a pawl and operating a ratchet 75 of one of the rollers 63, the other roller of the pair being idle, as stated hereinbefore. A gear 76 actuated by the right hand idler gear 64 is mounted on a sleeve 77, which surrounds shaft 69 and has a gear 78 secured thereto, which latter gear drives the pair of rollers 62 by a train of gears similar to that described in connection with the rollers 61. The upstanding portion 17 is provided with a flanged slot 80 having a bell crank 81 comprising arms 82 and 83 located therein, pivotally secured at 84 to the flanges of the slot. A flange 85 is formed with the top wall 22 and is provided with an opening 86 supporting a horizontally reciprocating bolt 87, provided near one end with a collar 88 and terminating in a bevel faced nose 89 adapted to engage a recess 90 in the knife 28 to lock the latter in its normal position. The other end of the bolt 87 is provided with an eye 91 which is engaged by arm 83 of the bell crank 81.

A sliding carriage indicated in its entirety by 95 comprises a top wall 96, front wall 97, rear wall 98 and side walls 99 and 100. The sliding carriage has a recessed portion 101 conforming substantially to the elevated portion 17 and adapted to abut against it when the carriage is in its forward position. The side wall 100 has an outwardly projecting pin 102 adapted to lock with any one of the triggers 43, while its lower end is provided with a plurality of wheels 103 which run on the track 23 and support one side of the carriage. The lower end of wall 99 is provided with a grooved guideway 104 secured thereto in any convenient manner to support the other side of the carriage 95. The top wall 96 is provided with a keyhole 105 for the introduction of key 106, the purpose of which will be fully described hereinafter. Any number of additional keyholes and appurtenances are provided, but as they are identical except as to the shape of the wings of the different keys and the recesses into which they fit, only one set will be described. A bracketed keyhole plate 107 is secured to the inner side of the front wall 97 and is substantially parallel with the top wall 96. This plate is provided with a keyhole 108 located below keyhole 105. Two vertical guide rods 109 and 110 extend from the roof 96 to the bottom plate of the slidable carriage 95. A yoke 111 having a plurality of differently shaped key recesses 112 is slidably mounted on said guide rods and has formed therewith a downwardly projecting finger 113. A vertical shaft 114 is arranged in the carriage 95 and has a notch 115. A finger 116 is pivoted on the top of the yoke, being normally held in engagement with the notch 115 in shaft 114 by spring 117. A pair of brackets 118 are secured to the walls 99 and 100 and are provided with openings 119 by which sleeves secured to yoke 111 and sliding on the vertical guide rods 109 and 110 are guided. Helical springs 120 are located between the yoke 111 and the brackets 118 and normally maintain the yoke 111 near the upper end of said guide rods. A walking beam 121 is located beneath the yoke 111 and in the same plane therewith, and is fulcrumed on the bracket 122 secured to the lower plate of the carriage 95. This walking beam has suspended at one end a swinging plunger 123 operating through an opening 124 in the lower plate of the carriage 95, while its other end is provided with a lock plunger 125 passing through a stationary sleeve 126 secured to the lower part of the slidable carriage 95 and is adapted to abut in its locked position (shown in Fig. 4) against the wall of the stationary member 10 and lock the carriage 95 thereto. Clearance is provided between the plunger 125 and the sleeve. The swinging plunger 123 bears on the top of the arm 82 of the bell crank 81 and is adapted on its downward reciprocation to rock it and release the knife 28. A vertical spindle 127, axially located with respect to each set of keyholes 105 and 108 extends upwardly in carriage 95 to position the key 106 when inserted.

A plurality of sleeves 128, 129 and 130 are bracketed to the carriage 95 and carry the individual letter type bars 131, 132 and 133, respectively, normally held in a retracted position in the sleeves by springs 134 (see Fig. 5). Each type bar has an arm 135 secured thereto extending through opening 136 in the sleeves and having one end abutting against spindles 127. The arms 135 are adapted to be struck and depressed by a key, as 106, placed over any one of these spindles and fitting the key recess accompanying that particular spindle. Each type bar is provided with a bevel-face pin 137 extending from one side thereof and through a suitable slot in the sleeve. A shaft 138 passes through the sleeves 128, 129 and 130 above the ends of the type bars in their uppermost position. A plurality of cams 139, one of which is elongated and having cam face 139', are secured to said shaft so that the movement of the elongated cam will rock the others. The cams 139 each have a shoulder 140 adapted to engage pins 137 when the type is pressed into printing position and hold it in such position until released. A flat spring 141 is secured to one of the sleeves and bears against the elongated cam 139, normally holding the shoulders 140 of all the cams in position to engage the pins 137. A face plate 142 is secured to and bridges the sleeves 128, 129 and 130. This plate is provided with a bracket 143 having a cam face 144 adapted to throw the finger 116 out of engagement with the notch 115 in shaft 114 and permit the yoke 111 to return to its normal position. A stationary frame 145 is secured to the walls 99 and 100 by suitable brackets and is provided with oppositely disposed vertical grooves 146 and an upstanding ear 147 on which is a bell crank 148 having one arm 149 provided with a curved slot 150 and the other arm 151 with a cam face 152. An eccentric member 153 is pivotally mounted on the stationary frame 145 in such a position that the elongated cam 139 will be actuated thereby, on the upward movement of the stationary frame 145. A spring 154 normally holds the member 153 in the position shown in Fig. 2. A stamping member 155 having a reversing printing face 156 of the usual construction is adapted to stamp advertising matter on the paper. Mechanism well known in the art for applying a serial number which changes with each stamping operation should also be provided. A vertically reciprocating manually operated handle 157 is secured to the printing member 155 by a frame 158 and is adapted to carry said printing face in a downward direction to reverse and thereby bring it into contact with the paper on application of pressure to said handle. The sleeves 128, 129 and 130 are secured to the frame 158 and move with it. The elongated cam 139 passes eccentric 153 on the downward movement without being rocked but on the upward movement the eccentric, being prevented from rotating by a stop pin, actuates said cam and releases the type bar. A rack 159 is secured to frame 158 and engages the gears which actuate the rubber-covered rollers for ejecting the wrapping paper during the operation of the device on the downward movement of handle 157. A pin 160 extends from the side of the frame 158 and is adapted to strike the cam face 152 of the bell crank 148 and rock it, on the downward movement of the handle 157. A bracket 161 is secured to the wall 99 and carries a vertically reciprocating plunger 162 having a lifting foot 163 secured to its lower end normally held in a downward position by a helical spring 164 which surrounds the plunger 162 and bears between the bracket 161 and the foot 163. The plunger 162 is provided with a pin 165 engaging the curved slot 150 of the bell crank 148. The upper end of the vertically reciprocating plunger 162 is provided with a stop pin 166 to limit its downward movement. The foot 163 of this plunger is normally positioned below the plate 58 and is adapted on its upward reciprocation to carry said plate with its accompanying presser plate 56 in a vertical direction and thus release the paper normally clamped between it and the printing bed 20.

In the operation of our device, each sales person being provided with a different character of key, as 106, inserts such key into the appropriate openings as 105 and 108, and over a spindle as 143, and manipulates it until its wards engage the corresponding recess 112 in the slidable yoke 111. The application of downward pressure on the key after it is so placed, depresses the yoke 111 and simultaneously forces down the individual type bar as 131, through the intervention of plate 135, into the printing plane. The downward movement of the finger 113 of the yoke 111 rocks the walking beam 121, disengages the lock plunger 125 and releases the carriage 95; rocks the bell crank 81, releases the bevel-faced member 89 of the bolt 87 from engagement with the knife 28 and permits said knife to be raised by the spring 47. The carriage 95 is then moved by hand toward the left, as indicated by dotted lines in Fig. 1 of the drawing, to a position over the particular width of paper desired. The pin 102 on the side of the sliding carriage will engage one of the triggers 43 and the carriage will be locked in proper position thereby. By pressing downward on the handle 157, the printing face 156 and the individual type, as 131, are forced against the appropriate strip of paper lying across the printing bed 20, thus printing on the paper such matter, including a serial number and the identifying mark of the particular sales person, as may be provided on the printing surfaces. The downward movement of the handle 157 lifts the foot 163 by means of the bell crank 148, thus lifting the plate 58, and its accompanying presser plate 56, and releasing the paper. The downward reciprocation of the handle 157 and is appurtenances carries with it the rack 159 which strikes the middle idler gear 64 (when the carriage is in the position shown by dotted lines in Fig. 1), thereby rotating gear 68, shaft 69 and gear 78, which in turn actuates the pawl and ratchet, and operating the rollers 62, causing the paper to move to the right, when viewed as in Fig. 3, sufficiently to permit its being grasped and pulled out to the extent desired through opening 25. On the return movement of the rack 159 the train of gears rotates in an opposite direction, leaving the feed rollers stationary. After the printing operation is finished, a spring (not shown) returns the handle and its appurtenances to their normal retracted position. The knife 28 is then swung downward so that its knife edge engages the knife edge 27 of the knife plate 26 and severs the desired length of paper. The downward movement of the knife also swings the arm 30 against the horizontally slidable plate 41 causing said plate and its accompanying triggers 43 to swing downwardly on links 42 and release the carriage 95. The carriage, which is preferably spring-pressed toward the right by a spring (not shown), moves toward the front end of the frame on its release and becomes locked by engagement of plunger 125 with the frame. The downward movement of the knife 28 also operates the arm 54 which engages the striker plate 53, forcing the shaft 49 toward the right and disengaging the triggers 50 from the plate 58 secured to the presser feet 55' and presser plate 56, permitting them to resume their normal position,—locking the paper to the bed 20. The upward movement of the handle 157 forces elongated cam 139 into engagement with the eccentric 153, rocking the shaft 138 and releasing pin 137 of the individual type carrier (which may have been in operative position), which is then retracted by the spring 134 out of the printing plane. The device is now ready for a repetition of the previously described operation.

It will be observed that the mechanism above described prevents paper from being used until properly stamped. The knife 28 being normally locked and guarding the paper opening 25, can only be released when a proper key, as 106, is inserted in the proper keyhole, and as the presser plate 56 locking the strips of paper to printing bed 20 is only released by the operation of the printing mechanism, the paper must be stamped before it can be obtained.

Since any number of rolls of paper may be employed, when we speak in our claims of strips of paper, we also mean to include one strip.

We claim:

1. In a wrapping paper dispensing apparatus, the combination of means for holding the paper in position to receive a printing impression, a carriage carrying a printing mechanism and movable to and from a printing position, a knife for severing the paper, and means whereby the cutting stroke of the knife will effect the movement of the carriage away from the printing position.

2. In a wrapping paper dispensing machine, the combination of a paper exit, a paper severing knife normally closing said exit, a carriage carrying a printing mechanism normally locking the knife in its said normal position and having a movement toward and away from a printing position, means whereby the carriage will release the knife on moving toward its printing position, and means whereby the severing stroke of the knife will effect the return of the carriage.

3. In an apparatus of the character described, the combination of a stationary paper holding casing containing a plurality of strips of paper, a carriage carrying stamping mechanism sliding in said stationary member to a position in operative relation with any one of said strips of paper, means to lock said carriage out of printing relation with the strips of paper, a plurality of individual types, and a key capable of operating but one of said types to release said carriage and permit it to move to a printing position and to simultaneously depress one of said types.

4. In an apparatus of the character described, the combination of a stationary paper holding member containing a plurality of strips of paper, a carriage carrying stamping mechanism sliding in said stationary member and adapted to carry said stamping mechanism to an operative position with respect to any one of said strips of paper, a knife secured to said stationary member to sever the paper normally locked in said holding member, a lock plunger locking the carriage to the stationary member, and means to simultaneously release said knife and retract the lock plunger and thereby release the carriage and permit it to be moved into printing relation with one of the strips of the paper.

5. In an apparatus of the character described, the combination of a stationary member, a plurality of strips of paper in said member adapted to be removed therefrom, a presser plate normally locking said paper strips, a movable carriage normally locked out of printing position with respect to said strips, stamping means in said movable carriage, means to release said movable carriage and permit it to move into printing relation with any one of the strips of paper, and to unlock said presser plate from engagement with said strips of paper.

6. In an apparatus of the character described, the combination of a stationary member containing strips of paper, means to eject a portion of one of the paper strips, means to sever the ejected portion, a movable carriage slidable relatively to said stationary member, stamping means in said movable carriage adapted to be carried by said carriage to operative relation with any one of said strips, and means to release said severing means and simultaneously unlock said carriage and permit it to move to a printing position.

7. In an apparatus of the character described, the combination with a stationary member having oppositely disposed horizontal openings, a printing bed, rolls of paper secured to said stationary member, the strips of paper from said rolls passing through said openings and over the printing bed, a presser plate normally locking said paper to the bed, a horizontal shaft having a striker plate and triggers to hold the presser feet in position when lifted, a transverse shaft in said stationary member, arms secured to each end of the transverse shaft, a knife plate secured to said stationary member, a knife secured to said transverse shaft, a trigger plate having triggers mounted on said stationary member, a carriage slidable in said stationary member, the carriage being adapted to lock with said triggers and carrying stamping mechanism, means for said stamping member to release it when the stamping mechanism has been operated and to release said presser plate, the operation of the knife severing the paper, releasing the trigger plate from the carriage and permitting the presser feet to reëngage said paper.

In witness whereof we subscribe our signatures.

LOUIS A. GROSSMAN.
RICHARD SCHIMEK.